No. 699,733. Patented May 13, 1902.
J. R. WILLIAMS.
HAND CULTIVATOR.
(Application filed Sept. 12, 1901.)
(No Model.)

Witnesses:
Arthur McArthur
H. C. Rodgers.

Inventor:
James R. Williams
By Fischer & Phelps
attys.

UNITED STATES PATENT OFFICE.

JAMES R. WILLIAMS, OF INDEPENDENCE, MISSOURI.

HAND-CULTIVATOR.

SPECIFICATION forming part of Letters Patent No. 699,733, dated May 13, 1902.

Application filed September 12, 1901. Serial No. 75,125. (No model.)

*To all whom it may concern:*

Be it known that I, JAMES R. WILLIAMS, a citizen of the United States, residing at Independence, in the county of Jackson and State of Missouri, have invented certain new and useful Improvements in Hand-Cultivators, of which the following is a specification.

My invention relates to hand-cultivators, and has for its object to produce a device of this character which can be operated with the minimum of power, enables the operator to plow at a uniform depth, and is of simple, strong, durable, and cheap construction.

To this end and others, as hereinafter appear, the invention consists in certain novel and peculiar features of construction and combinations of parts, as hereinafter described and claimed, and in order that it may be fully understood reference is to be had to the accompanying drawings, in which—

Figure 1:
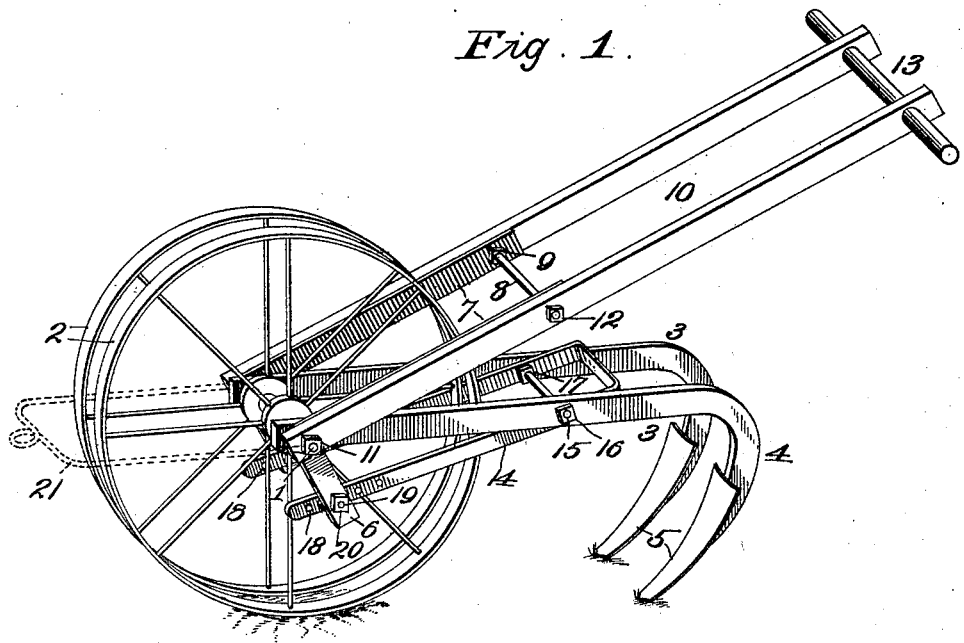
Figure 2:
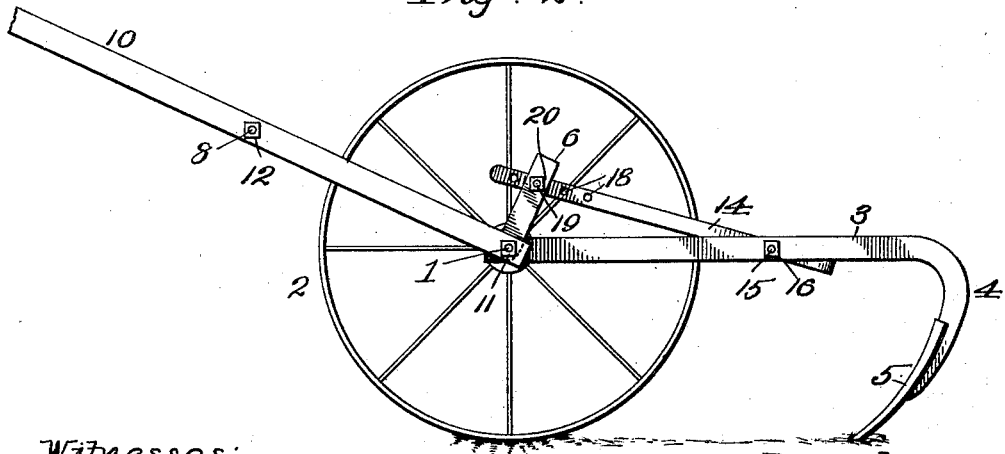

Figure 1 is a perspective view of a hand-cultivator constructed in accordance with my invention and arranged to be pushed in front of the operator. Fig. 2 is a side elevation of the cultivator as arranged to be pulled by the operator.

In the said drawings, 1 designates the axle, and 2 2 the traveling wheels thereof, the same being journaled upon the axle at a sufficient distance apart to insure stability when in motion. Journaled on the axle at the outer sides of the wheels are the plow-beams 3, the same extending rearwardly and parallel in the usual manner and having their rear ends bent downward, as at 4, and equipped with the usual or any preferred cultivating-shovels 5. Mounted upon the axle at the outer sides of the plow-beams are a pair of angle-plates, the same consisting of short arms 6 and long arms 7, the latter being connected by a cross-bolt 8, provided with nuts 9, (one only of which appears,) engaging the inner sides of said arms to maintain them in a parallel relation.

10 designates the draft-beams, which fit against the outer sides of long arms 7 of the angle-plates and, like the latter, are mounted upon the axle 1 and connected by cross-bolt 8, being held reliably in such position by means of the clamping-nuts 11, (one only of which appears,) engaging the axle, and clamping-nuts 12, (only one of which appears,) engaging the ends of bolt 8, and the rear ends of the draft-beams are connected by a cross-bar or handle 13, whereby the machine may be pushed or pulled.

To insure a perfectly-rigid relation between the plow-beams and the handle, so that vertical movement of the latter will impart corresponding movement to the former, a link 14, preferably U-shaped, fits snugly at the inner sides of the plow-beams upon a transverse bolt 15, connecting said beams rearward, by preference, of the wheels, said bolt being engaged at the outer and inner sides, respectively, of beams 3 and link 14 by nuts 16 and 17, only one of each set of said nuts being shown. The front portion of the link is provided with a longitudinal series of holes 18 for engagement with short bolts 19, which also extend through short arms 6 of the angle-plates and serve to clamp the link and arm rigidly together, clamping nuts 20 engaging their threaded ends.

Should it be desired to vary the vertical distance between the plows and the handle in order to permit the operator to conveniently plow at a greater or less depth, bolts 19 are removed and caused to engage holes 18 nearer to or farther from the front end of the link. In the former case it is obvious the adjustment of arms 6 forward results in a lowering of the handle, while their adjustment rearward effects a raising of the handle. In the former case the lowering of the handle for the same operator will enable him to conveniently plow a shallow furrow, while the raising of the handle will permit him to conveniently exert downward pressure for a greater distance, and therefore embed the shovels or plows deeper into the ground, and it will also be obvious, owing to the rigid relation between the handle and the plow, that it is only necessary for the operator to maintain the handle at about a certain elevation to insure a uniform depth of cut.

With hand-cultivators which exert a yielding pressure upon the plow-beams it is obvious that should a plot of ground be encountered harder than that through which the shovels or plows have just passed the latter will naturally ride upward somewhat without an accompanying movement on the part of the handle. This being true, it is clear that the operator has not the same control over the machine for maintaining the plow at a uniform depth as in a machine wherein the handle and the plow-beams occupy fixed relations.

The vertical adjustment of the handles described above is not only for the purpose of enabling the same operator to vary the depth of cut, but it also adapts the machine readily to persons of different height.

Where the machine is to be used by boys who lack the necessary weight and strength, it will be found desirable to remove bolts 19 and swing the draft-beams forwardly to assume the position shown in Fig. 2, the bolt 15 being removed to enable the operator to dispose the front end of the link above the axle. The link and plow-beams are then resecured by said bolt. The link is then reconnected by bolts 19 to arms 6 in their new position, as will be readily understood, and the same rigid relation subsists between the handle and the plows or shovels.

This cultivator is manipulated and is used between the rows like all hand-cultivators. In cultivating small vegetables—such as radishes, &c.—once through a row is sufficient; but where large vegetables—such as corn, potatoes, &c.—are cultivated it will usually be found necessary to make a round trip in each row, cultivating one row of plants in moving toward one end of the row and the other row of plants in returning to the starting-point. The mode of cultivating the plants, however, has no bearing on this invention.

Should it be desired to cultivate by means of horse-power, a yoke or clevis 21 (shown only in dotted lines) may be attached to the axle, the singletree (not shown) being pivoted to the front end of said yoke.

From the above description it will be apparent that I have produced a hand-cultivator which embodies the features of advantage enumerated as desirable in the statement of invention, and while I have illustrated and described the preferred embodiment of the same it is to be understood that I reserve the right to made such changes as properly fall within its spirit and scope.

Having thus described the invention, what I claim as new, and desire to secure by Letters Patent, is—

1. A hand-cultivator, comprising wheel-supported draft-beams, angle-plates secured rigidly to the draft-beams, plow-beams, equipped with shovels or plows secured at their front ends coincidently with the draft-beams, and a link clamped near one end to the plow-beams and near the other to the angle-plates and extending at an angle to both, substantially as described.

2. A hand-cultivator, comprising draft-beams, wheels journaled at one end of said draft-beams, plow-beams equipped with plows and secured at their front ends coincidently with said draft-beams, angle-plates secured to the draft-beams, and a link extending at an angle to and connecting the angle-plates with the plow-beams, substantially as described.

3. A hand-cultivator, comprising an axle, a pair of wheels journaled thereon, a pair of plow-beams equipped with shovels or plows, and pivoted at their front ends on said axle at the outer sides of said wheels, a pair of draft-beams connected together and mounted on the axle outward of the plow-beams, a pair of angle-plates, pivoted on the axle and secured to the draft-beams, and links detachably connecting said plates and plow-beams and extending at an angle to both, substantially as described.

4. A hand-cultivator, comprising an axle, plow-beams equipped with shovels or plows, and mounted at their front ends on the axle, a pair of draft-beams mounted at their front ends on the axle, and connected at their rear ends by a handle, a pair of angle-plates mounted on the axle at the inner sides of the draft-beams and bolted at their opposite ends to said beams, bolts mounted in the arms of the angle-plates projecting away from the draft-beams, and links engaging said bolts at their front ends and detachably connected to the plow-beams at their rear ends, substantially as described.

5. A hand-cultivator, comprising an axle, plow-beams equipped with plows or shovels, and mounted at their front ends on the axle, a pair of draft-beams mounted at their front ends on the axle, and connected at their rear ends by a handle, a pair of angle-plates mounted on the axle at the inner sides of the draft-beams and bolted at their opposite ends to said beams, a U-shaped link having a series of holes in its front ends, and bolted at its rear end to the plow-beams, bolts mounted in the arms of the angle-plates projecting away from the draft-beams, and engaging certain holes of said link, and clamping-nuts engaging the ends of said bolts, substantially as described.

6. A hand-cultivator, comprising a wheel-supported draft-beam, an angle-plate secured rigidly to the draft-beam, a plow-beam equipped with a shovel or plow and secured at its front end coincidently with the draft-beam, and a link clamped near one end to the plow-beam and near the other to the angle-plate, and extending at an angle to both, substantially as described.

In testimony whereof I affix my signature in the presence of two witnesses.

JAMES R. WILLIAMS.

Witnesses:
G. Y. THORPE,
J. E. METCALF.